United States Patent [19]

Mochizuki

[11] Patent Number: 4,781,486
[45] Date of Patent: Nov. 1, 1988

[54] SHAFT COUPLING

[76] Inventor: Masanori Mochizuki, 1-28, Yasunakacho 4-chome, Yao-shi, Osaka-fu, Japan

[21] Appl. No.: 937,617

[22] Filed: Dec. 3, 1986

[51] Int. Cl.⁴ .............................................. B25G 3/00
[52] U.S. Cl. .................................... 403/303; 403/370; 403/371
[58] Field of Search ................. 403/371, 370, 16, 314, 403/303, 309

[56] References Cited

U.S. PATENT DOCUMENTS

| 676,675 | 6/1901 | Davis | 403/303 |
|---|---|---|---|
| 4,025,213 | 5/1977 | Schafer et al. | 403/370 |
| 4,134,699 | 1/1979 | Schafer et al. | 403/314 X |
| 4,268,185 | 5/1981 | Mullenberg | 403/370 X |
| 4,428,275 | 1/1984 | Huperz | 403/370 X |

FOREIGN PATENT DOCUMENTS

| 52-107458 | 9/1977 | Japan . |
|---|---|---|
| 59-48886 | 11/1984 | Japan . |
| 60-256622 | 12/1985 | Japan . |
| 61-112823 | 5/1986 | Japan . |

Primary Examiner—Andrew V. Kundrat
Attorney, Agent, or Firm—Cushman, Darby & Cushman

[57] ABSTRACT

A shaft coupling comprising a joint element and two rings. The joint element has internal cylindrical parts, an external cylindrical part and a base connecting portion. The base connecting portion connects the base ends of both internal cylindrical parts and the external cylindrical parts. The rings are inserted into annular cavities enclosed by the internal cylindrical parts, external cylindrical parts and the base connecting portion. The internal cylindrical parts have tapered outer surfaces. The rings have tapered inner surfaces. The two rings are axially connected by set bolts. When the rings are tightened, the inner surfaces of the rings press the internal cylindrical parts and the outer surfaces of the rings press the external cylindrical parts.

8 Claims, 4 Drawing Sheets

SHAFT COUPLING

BACKGROUND OF THE INVENTION

1. Field of the Invention

This invention relates to a shaft coupling for transmitting torque from a drive shaft to a driven shaft. More particularly, the invention relates to a shaft coupling, which has a joint element having two cylinders, one on each side of the coupling, for inserting the two shafts, two rings for radially tightening the tapering cylindrical parts, and set bolts for tightening the rings in the axial direction.

2. Description of the Prior Art and Problems Thereof

A prior art shaft coupling for connecting a drive shaft with a driven shaft by clamping a clamping ring in the axial direction has been already proposed in Japanese Patent Publication (examined) No. 59-48886.

The shaft coupling in this prior art, as shown in FIG. 7, comprises a joint element and two rings (2). The joint element has tapering cylindrical parts (11) formed on both sides thereof.

Under such construction, the clamping rings (2) are tightened by a plurality of set bolts (3), (3) in the axial direction (toward the large diameter portion of the tapered surface). In the connected state in which shafts $D_1$ and $D_2$ are inserted into the cylindrical parts (11,11), the rings are drawn together due to the tightening force applied by the set bolts 3 whereby the inner surfaces (2, 2) of the rings radially tighten the cylindrical parts.

According to this prior art, the cylindrical part (11) is in contact with the whole outer periphery of the shaft (D) and a torque is transmitted from the shaft to the shaft coupling by frictional force due to the clamping force produced in this cylindrical part (11). As a result, disadvantages such as eccentricity or backlash which are apt to occur while using a coupling structure including a key or pin can be overcome.

According to this prior art, however, the greater part of the torque transmitted from the drive shaft to the driven shaft is supported only by the cylindrical parts and a portion connecting the cylindrical parts. The cylindrical parts 11 must be elastically bent inwardly in order to tighten the shafts D. Therefor, a large torsional rigidity cannot be given to the parts 11, which reduces the torque load that can be transmitted therethrough and increases the likelihood that the parts will be damaged during use.

SUMMARY OF THE INVENTION

Accordingly, it is an object of the present invention to provide a shaft coupling that is capable of transmitting a larger torque from one shaft to another. A further object of the present invention is to provide a shaft coupling having retaining rings and at least one set bolt that requires less tightening torque on the set bolt to properly position the retaining rings.

A further object of the present invention is to provide a shaft coupling that is easily assembled and disassembled.

In order to accomplish the foregoing object, there is provided according to the present invention a shaft coupling including a joint element having two tapered internal cylindrical parts 11 and two external cylindrical parts 12, wherein the internal cylindrical parts 11 are formed on both inner sides of the joint element for inserting two shafts and the two external cylindrical parts are formed on both outer sides of the joint element; two rings having tapered inner surfaces for fitting the tapering cylindrical parts and being surrounded by the external cylindrical parts; and means for tightening the rings in the direction of their approach to each other to press the internal cylindrical parts inwardly into frictional engagement with the shafts.

Accordingly, there are provided two torque transmission routes from the shaft to the shaft coupling, namely: (1) the shaft to the cylindrical part to the main body, and (2) the shaft to the cylindrical part (11) to the clamping ring to the external cylindrical part to the body.

As a result of the foregoing constructions and function, the present invention exhibits the following advantageous effects.

Since there are two torque transmission routes between the shaft and the shaft coupling body, the return rigidity of the torque transmission sections is large and therefore it becomes possible to transmit a larger torque than the prior art shaft couplers that are above described.

Other objects, features and characteristics of the present invention will become apparent in the following course of the following description and appended claims with reference to the accompanying drawings.

BRIEF DESCRIPTION OF THE DRAWINGS

In the drawings forming a part of the present application, and in which like parts are designated like reference numerals throughout the same.

DETAILED DESCRIPTION OF THE PREFERRED EMBODIMENTS

1. First embodiment

Figure 1:
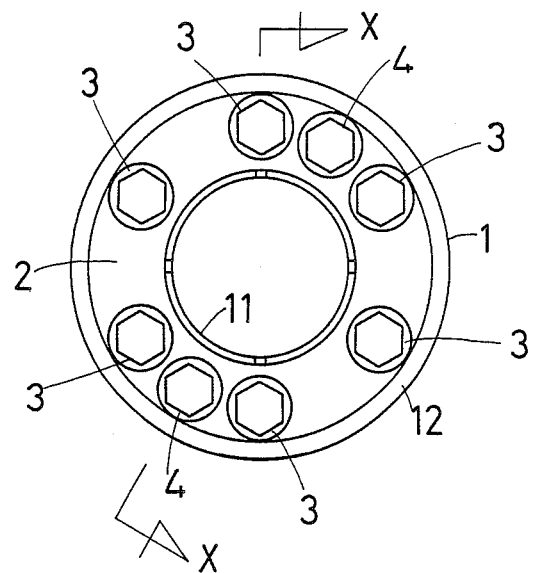
FIG. 1 is a front view of a first embodiment of the present invention.
Figure 2:
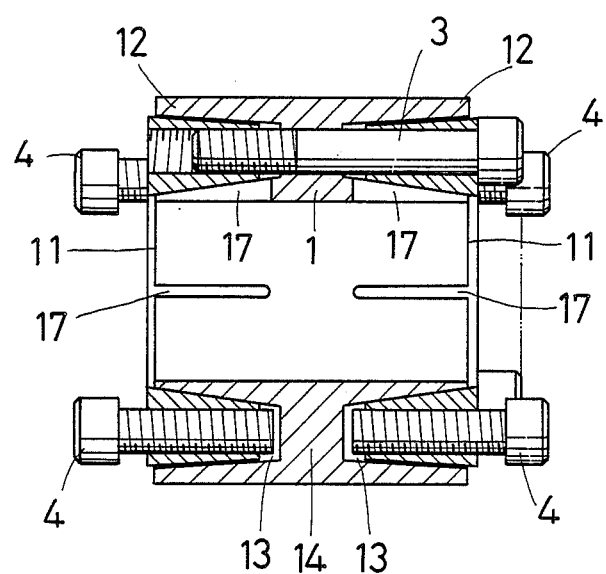
FIG. 2 is a sectional view taken along the line X—X in FIG. 1.
Figure 3:
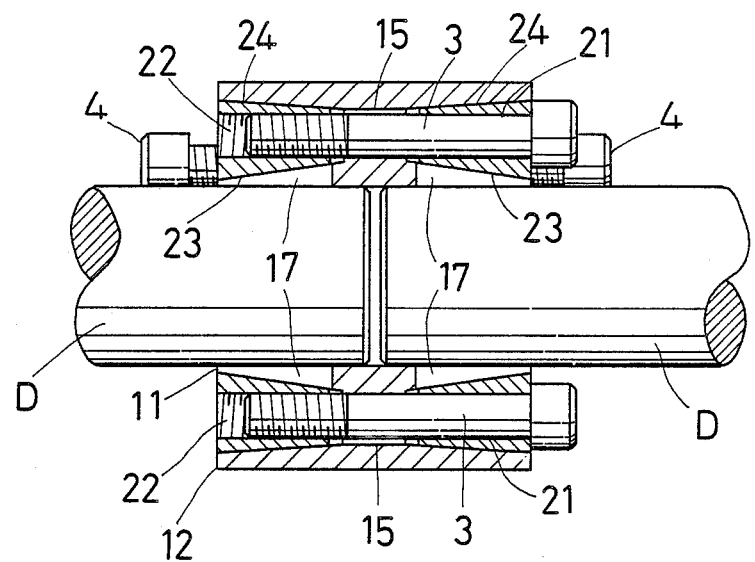
FIG. 3 is a sectional view showing a clamped state.

In the first embodiment of this invention, as shown in FIGS. 1 to 3, a shaft coupling having an overall cylindrical shape is formed for connecting a drive shaft and a driven shaft in a linear relation.

A joint element (1) is formed in a ring shape. Internal cylindrical parts (11) and external cylindrical parts (12) are formed at both axial ends of the joint element (1). Slits (17) are axially formed at both ends of the internal cylindrical parts (11).

Annular cavities (13) are formed between the internal cylindrical parts (11) and the external cylindrical parts (12) for inserting rings (2).

A bulkhead (14), which is a portion of the joint element (1), is formed between annular cavities (13) and (13). Bores (15) are axially formed in the bulkhead (14).

Further, through-holes (21) are axially defined in one ring (2), and tapped-holes (22) are axially defined in the other ring (2). The through-holes (21) and the tapped-holes (22) are colinear with each of the bores (15). Set bolts (3) are screwed in the tapped holes (22) through the through-holes (21) and the bores (15).

In addition, in this first embodiment, the inner surfaces of the external cylindrical parts (12) are tapered so that the diameters decrease inwardly and the outer surfaces of the internal cylindrical parts (11) are tapered so that the diameters decrease outwardly.

The inner and outer surfaces of the rings (2) are tapered respectively for being adapted to the tapering surfaces of the internal cylindrical parts (11) and the external cylindrical parts (12). The outer surfaces of the internal cylindrical parts (11) and the inner surfaces of the rings (2) are called first tapering surfaces (23). The inner surfaces of the external cylindrical parts (12) and the outer surfaces of the rings (2) are called second tapering surfaces (24). The taper value of the second tapering surfaces (24) is half that of the first tapering surface (23).

The difference between the largest diameter and the smallest diameter of a truncated cone is denoted by (D), and the length of the truncated cone is denoted by (L). The taper value (T) is defined by the equation $$T=D/L$$

In this embodiment, the taper value of the first tapering surface (23) is a quarter and the value of the second tapering surface (24) is one eighth.

In the initial stage (i.e., when the rings (2) and (2) are not tightened yet), 0.08 to 0.1 mm of clearance should be given between the outer surfaces of the rigns (2) and the inner surfaces of the external cylindrical parts (12).

Under the condition that a thickness of the internal cylindrical parts (11) and the rings (2) of which tapering surfaces are set up said value, are established properly, when he rings (2) inserted into the annular cavities (13) are tightened by the set bolts (3), the rings (2) move by 1.5 mm in axial direction.

At the result, the diameters of the rings (2) are expanded and the above mentioned clearances disappear. In other words, the rings press against the inner surfaces of the external cylindrical parts (12).

In this case, a torque is transmitted by a new route which contains the external cylindrical parts (12) as well as by the usual route which contains the internal cylindrical parts (11).

2. Second embodiment

Figure 4:
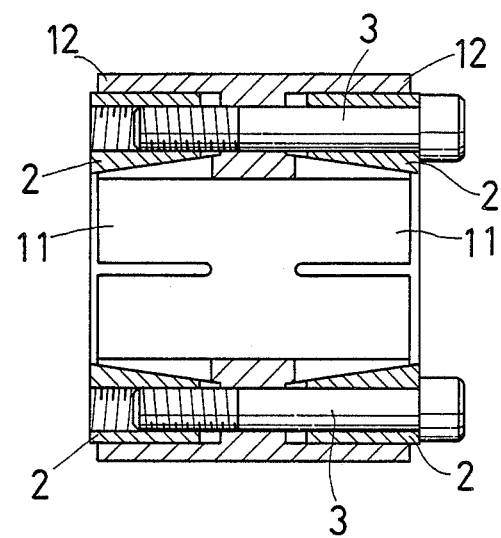
FIG. 4 is a sectional view of a second embodiment of the invention.

In another embodiment, as shown in FIG. 4, the inner surfaces of the external cylindrical parts (12) and outer surfaces of the rings (2) are cylindrical, and the clearance between the inner surfaces of the external cylindrical parts (12) and the outer surfaces of the rings (2) are set up as small as the tolerance allowed by JIS (Japanese Industrial Standard) 7th grade (H7).

Other portions except the above mentioned are similar to the 1st embodiment structurally (such as the taper value of the outer surfaces of the internal cylindrical parts (11) and the inner surfaces of the rings (2), and others).

In this embodiment also, when the rings (2) are tightened by the set bolts (3), the outer surfaces of the rings (2) press against the inner surfaces of the external cylindrical parts (12).

In addition, as shown in FIG. 1 and FIG. 2, a plurality of bolts (4) for disassembling are screwed in both rings (2) in these embodiments. These bolts for disassembling pass through screw holes of the rings (2). The ends of the bolts (4) contact with the bulkhead (14). Accordingly, when these bolts (4) are screwed in forward and the set bolts (3) are loosed, the rings (2) and (2) are taken out of the annular cavities (13) and (13).

3. Third embodiment

Figure 5:
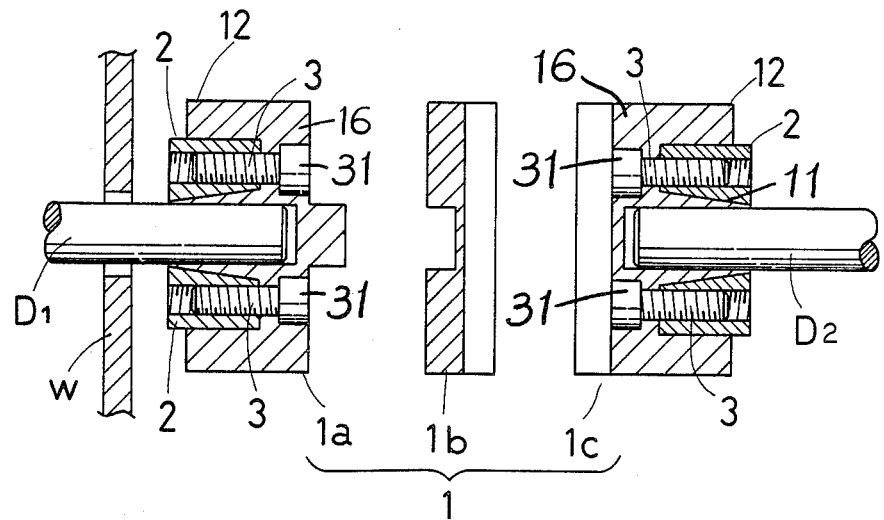
FIG. 5 is an explanatory view of a third embodiment.

In the third embodiment, as shown in FIG. 5, this invention is applied to an Oldham's coupling in which the joint element (1) comprises an input side connecting section (1a), an intermediate member (1b) and an output side connecting section (1c).

Each of the input side connection section (1a) and the output side connecting section (1c) comprises a cylindrical part (11), a flange (16) formed at the base end of the cylindrical part (11), an external cylindrical part (12) projecting from the flange (16) in parallel with the cylindrical part (11) and the external cylindrical part (12), set bolts (3) screwed into the ring (2) through the flange (16) and a member for engaging with the intermediate member (1b) in the opposite side to the external cylindrical part (12).

After the input side connecting sections (1a) and the output side connecting sections (1c) are connected with the two shafts (D) and (D) respectively, they are engaged with the intermediate member (1b). Then a transmissive coupling is attained.

In this embodiment, since heads (31) of the set bolts (3) face with the flange (16) without projecting from the flange (16), these heads (31) are not obstructive for the torque transmitting operation.

Further, this embodiment is applicable even to the case in which one shaft ($D_1$) is projecting a little from a fixed wall (W) and the other shaft ($D_2$) is connected to a motor, because the input and output side connecting sections (1a) and (1c) are separable.

4. Fourth embodiment

Figure 6:
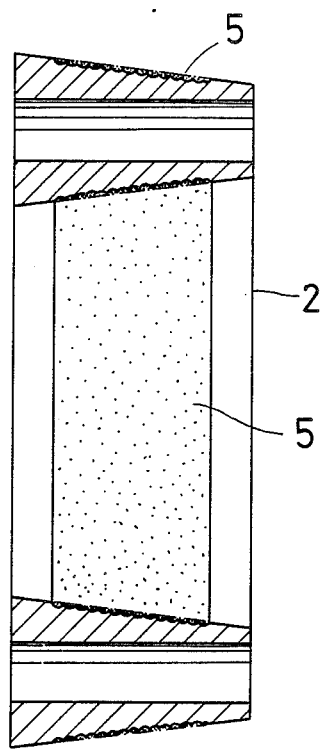
FIG. 6 is an enlarged sectional view of a clamping ring of a fourth embodiment.

According to the fourth embodiment shown in FIG. 6, the tapering inner and outer surfaces of he rings (2) and (2) are partially formed into continuous irregular ones by shot blasting or shot peening. And an anti-friction material (5) such as molybudenum disulfide is painted to the irregular surfaces and dried so that the concave portions of the irregular surfaces are filled with the anti-friction material.

Thus, the sliding resistance is reduced when the rings (2) are forced into the annular cavities (13) by tightening the set bolts (3).

Accordingly, a large torque transmission is attained even when the tightening force of the set bolts (3) is small. Furthermore, since a layer of the dried anti-friction material (5) is formed on the irregular surfaces, it strongly adhere to the surfaces of the rings (2). peeling of the anti-friction material by tightening and dismounting of the rings (2) is successfully prevented.

In all embodiments described above, a circumferential rigidity of the rings (2) is determined by the following requirement. So long as the outer surface of the rings (2) are pressed against the inner surfaces of the external cylindrical parts 11, 12) by tightening the set bolts (3), circumferential strain of the rings (2) is safely restricted within the elastic limit of strain. Accordingly, when the shafts are in a coupled state, an elastic force of the rings (2) is applied at all times to the internal cylindrical parts (11) as a shaft tightening force. There is no possibility of loosening the portion connecting the shafts and the internal cylindrical parts (11) with the lapse of time during the transmission.

Besides, it is preferable to apply the present invention to any other shaft couplings such as universal joint in which two shafts are also transmissively connected.

In addition, although the internal cylindrical parts (11) have the slits (17) in the axial directions, these slits (17) are not always necessary. They are effective especially in the case that the cylindrical part (11) is very thick.

(1) Each cylindrical part (11) was formed into the same size corresponding to the shaft (D) of 25 mm in diameter.

(2) Eight set bolts (3) were used.

(3) The tightening torque of each set bolt (3) was 1.6 kgm.

(4) The torque applied from the shaft (D) to the shaft coupling was 50 kgm.

(5) The material of the body (1) of the shaft coupling was chromium-molybudenum steel (JIS:SCM-430) and that of the shaft (D) was carbon steel (JIS:S45C).

(6) The distance between the point actioned by torque and the end of cylindrical part (11) was 100 mm.

As a result of the above comparison tests, it was found that in the first to fourth embodiments, a permanent deformation of torsion did not occur in the internal cylindrical parts (11) but occurred in the shaft (D). To the contrary, in the prior art in FIG. 7, a permanent deformation of torsion occurred in the cylindrical part (11) instead of the shaft (D).

Figure 7:
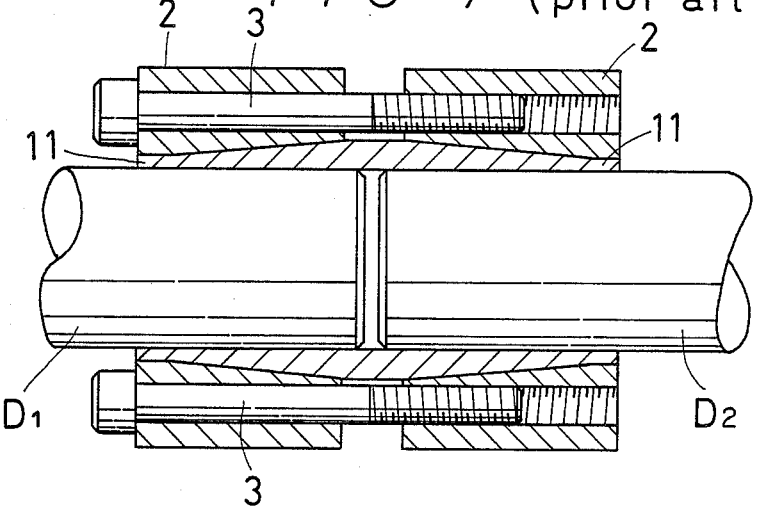
FIG. 7 is an explanator view of a prior art.

With regard to the torsional rigidity of each shaft coupling when a certain torque was applied between the shaft connecting part of the drive shaft and that of the driven shaft, it was found that the shaft coupling of the first embodiment exhibited about seven times greater rigidity than the prior shaft coupling in FIG. 7.

It is further understood by the skilled in the art that the foregoing description is only about preferred embodiments of the disclosed invention and that various changes and modifications may be made without departing from the spirit of the invention.

What is claimed is:

1. An apparatus for coupling a pair of shafts, comprising:
   a pair of joint elements each having an internal cylindrical part with an inwardly tapered outer surface and an interior bore for receiving one of the shafts, each joint element further having an external cylindrical part which together with said internal parts defines an annular tapered recess;
   a pair of ring members receivable in said tapered recesses, respectively, each said ring member having at least one tapped bore defined therein and constructed so that when said ring member is not tightened, its outer surface is not in contact with the inner surface of said external cylindrical part:
   means for connecting each of said joint elements to the other; and
   means insertable into said tapped bores for urging said ring members into said tapered recesses, whereby the inner surfaces of said ring members radially press said internal cylindrical parts to cause said internal cylindrical parts to press inwardly and frictionally engage each of the shafts and at the same time the diameters of said ring members expand because of their elasticity to cause the outer surfaces of said ring members to press against the inner surfaces of said external cylindrical parts so that torque is transmitted from one shaft to the other through a first and second torque transmission routes, said first torque transmission route being from said shaft to said internal cylindrical part of joint element to said connecting means and said second torque transmission route being from said shaft to said internal cylindrical part of joint element to said ring member to said external cylindrical part of said joint element to said connecting means.

2. Apparatus according to claim 1, wherein said connecting means comprises an intermediate joint member that is lockable against rotation with respect to each of said joint elements, whereby torque may be transferred from both the external and internal parts of one of said joint elements to said intermediate joint member and then to the internal and external parts of the other of said joint elements.

3. Apparatus according to claim 1, wherein each of said ring members have a tapered inner surface for engaging said inwardly tapered outer surface of said internal cylindrical part.

4. Apparatus according to claim 1, wherein said external cylindrical part defines a right cylindrical inner surface that is engageable by a right cylindrical outer surface on said ring member.

5. Apparatus according to claim 3, wherein a taper value of an outer surface of each of said ring members is less than a corresponding taper value for said inner surface of said ring members.

6. Apparatus according to claim 1, wherein said connecting means comprises an Oldham's coupling.

7. Apparatus according to claim 1, wherein said connecting means comprises a universal joint.

8. Apparatus according to claim 6, wherein the surfaces of said ring members which are contactable with said annular tapered recess has a continuous irregular texture, and wherein dried anti-friction composition layers are formed on said surfaces.

* * * * *